(12) United States Patent
Nixon et al.

(10) Patent No.: US 7,574,509 B2
(45) Date of Patent: Aug. 11, 2009

(54) INTERACTIVE TWO-WAY COLLABORATION IN PROCESS CONTROL PLANTS

(75) Inventors: Mark J. Nixon, Round Rock, TX (US);
Neil J. Peterson, Austin, TX (US);
Trevor D. Schleiss, Austin, TX (US);
Teresa Chatkoff, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 733 days.

(21) Appl. No.: 10/303,513

(22) Filed: Nov. 25, 2002

(65) Prior Publication Data

US 2004/0103165 A1 May 27, 2004

(51) Int. Cl.
*G06F 15/16* (2006.01)
*G06F 17/30* (2006.01)

(52) U.S. Cl. .............. 709/228; 709/217; 709/203; 707/3; 707/10; 715/743; 715/205; 715/810

(58) Field of Classification Search .............. 709/228, 709/217, 203; 700/282, 2, 19, 17; 713/166, 713/170, 171
See application file for complete search history.

(56) References Cited

U.S. PATENT DOCUMENTS

| | | | |
|---|---|---|---|
| 6,282,454 B1 | 8/2001 | Papadopoulos et al. | 700/83 |
| 6,370,448 B1 * | 4/2002 | Eryurek | 700/282 |
| 6,560,631 B1 * | 5/2003 | Ishihara et al. | 709/201 |
| 6,690,274 B1 * | 2/2004 | Bristol | 340/506 |
| 6,898,708 B2 * | 5/2005 | Hori et al. | 713/171 |
| 6,986,159 B1 * | 1/2006 | Shimoji et al. | 725/142 |
| 7,017,116 B2 * | 3/2006 | Elsbree et al. | 715/740 |
| 7,139,813 B1 * | 11/2006 | Wallenius | 709/219 |
| 2002/0080938 A1 | 6/2002 | Alexander, III et al. | |

| | | | |
|---|---|---|---|
| 2002/0171558 A1 | 11/2002 | Bartelheim et al. | 340/825.49 |

FOREIGN PATENT DOCUMENTS

| | | |
|---|---|---|
| EP | 0369188 A3 | 5/1990 |
| JP | 11-264747 | 9/1999 |

(Continued)

OTHER PUBLICATIONS

Chinese Patent Office, First Office Action of Chinese Patent Application No. 200310116440.5, Feb. 2006, 24 Pages.

(Continued)

*Primary Examiner*—Jude J Jean Gilles
(74) *Attorney, Agent, or Firm*—Hanley, Flight and Zimmerman, LLC (57) ABSTRACT

Systems and methods of transmitting process control information to a portable communication device associate a resource link with the process control information and transmit the process control information and the resource link to the portable communication device. A session identifier is associated with the process control information and the session identifier and the resource link are transmitted to the portable communication device. A message and the resource link associated with the process control information are provided at the portable communication device. A user selects the resource link to initiate a communication link between the portable communication device and a wireless communication service. The portable communication device may receive one of video information, audio information, still image information, and software application information in response to initiation of the communication link between the wireless communication service and the portable communication device.

58 Claims, 4 Drawing Sheets

FOREIGN PATENT DOCUMENTS

| | | |
|---|---|---|
| JP | 2003005827 | 1/2003 |
| JP | 2003051895 | 2/2003 |
| JP | 2003202917 | 7/2003 |
| WO | WO 96/12993 | 10/1995 |

OTHER PUBLICATIONS

The Patent Office, *Examination Report*, Jul. 26, 2005, 1 page.

Search Report. The Patent Office. Great Britain. Search date: Apr. 15, 2004. pp. 1.

"Product Data Sheet: OPC Pager." Emerson Process Management. Original publication date: Mar. 2000.

Official Action dated Mar. 2, 2009, in Japanese Application No. 2003-388676 (5 pages).

Chinese Intellectual Property Office issued on Feb. 13, 2009, Text of The First Office Action (English Translation) in Chinese patent application No. 200610162593.7, 5 pages.

* cited by examiner

INTERACTIVE TWO-WAY COLLABORATION IN PROCESS CONTROL PLANTS

FIELD OF THE DISCLOSURE

The present invention relates generally to process control systems and, more specifically, to interactive two-way collaboration in process control plants.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Typically, a process control system operates within a business enterprise that may include several process control plants, component and/or service suppliers and customers, all of which may be distributed throughout a large geographic area or, in some cases, throughout the world. The process control plants, suppliers and customers may communicate with each other using a variety of communication media and technologies or platforms such as, for example, the Internet, satellite links, ground-based wireless transmissions, telephone lines, etc.

Of course, the Internet has become a preferred communication platform for many business enterprises because it provides an established communications infrastructure, which tends to minimize the communication infrastructure costs for an enterprise. Additionally, the technologies used to communicate information via the Internet are well-understood, stable, secure, etc. Further, the increased geographic distribution of typical enterprises in combination with the increased degree of automation and, as a result, the need to have fewer more productive or efficient employees, has resulted in the development and proliferation of highly-portable, full-featured communication platforms. For example, personal data assistants (PDAs), cellular telephones, pagers, notepads, tablets, laptop computers, wearable computers and other communication platforms and devices (many of which are currently available as web-enabled devices) are currently used to leverage employees throughout large business enterprises, many of which are distributed across large geographic areas.

The proliferation of portable communication platforms and devices has been accompanied by the development and proliferation of improved operating systems such as, for example, Windows XP®, Microsoft.NET™, etc. and communication protocol improvements such as, for example, Ethernet, voice over Internet protocol (IP), streaming video, etc. In addition, improved information or data transfer and central data storage devices and techniques such as those provided by, for example, extensible markup language (XML), simple object access protocol (SOAP), universal description, discovery and integration (UDDI), etc., improved orchestration systems or servers such as, for example, Biztalk®, improved programming languages that are execution platform insensitive such as, for example, Java, and a host of other improved communication and/or data management tools, standards, protocols, programming languages, etc. have developed along with the proliferation of portable communication platforms. Most, if not all, of these communication and/or data management tools are currently used in conjunction with wireless communications, particularly in situations where the communication and/or data management tools are operating, at least in part, in conjunction with one or more portable communication devices.

Each process control plant within an enterprise may include one or more process control systems as well as a number of other business-related or information technology systems that are needed to support or maintain, or that are complementary to, the overall operation of the process control systems. In general, the information technology systems associated with a process control plant may include manufacturing execution systems such as, for example, a maintenance management system and may also include enterprise resource planning systems such as, for example, scheduling, accounting and procurement systems. Although these information technology systems may be physically located within or near a plant, in some cases a few, or possibly all, of these systems may be remotely located with respect to the plant and may communicate with the plant using the Internet or any other suitable communication link using any desired combination of wireless and/or hardwired communication media and techniques.

Each process control plant within an enterprise may also include user-interactive applications that may be executed on a server or workstation that is communicatively coupled to one or more servers, workstations, or other computers that coordinate or perform the activities of the process control system within the plant. Such user-interactive applications may perform campaign management functions, historical data management functions, asset management functions, batch management functions, etc. In addition, each of the process control systems may include process management applications that may, for example, manage the communications of and provide information relating to alarm and/or other process events, provide information or data relating to the condition of the process or processes performed by the process control plant, provide information or data relating to the condition or performance of equipment associated with the process control plant, etc. In particular, process management applications may include vibration monitoring applications, real-time optimization applications, expert system applications, predictive maintenance applications, control loop monitoring applications, or any other applications related to controlling, monitoring and/or maintaining a process control system or plant.

Still further, a process control plant or enterprise may include one or more communication applications that may be used to communicate information from the process control system or plant to a user via a variety of different communication media and platforms. For example, these communication applications may include e-mail applications, paging applications, voice messaging applications, file-based applications, etc., all of which may send information via wireless or hardwired media to a desktop computer, a laptop computer, a personal data assistant, a cellular phone or pager, or any other type of device or hardware platform.

Paging applications are often used to convey process control alarm or alert information to portable communication devices, such as cellular pagers, cellular telephones, PDAs and laptops equipped with a cellular or other wireless communication interface, etc. Generally speaking, alarm or alert information is usually generated by a process control system and conveyed to one or more persons (via their portable communication device or devices) associated with the operation of the process control system in response to the occurrence and detection of certain event conditions within the process control system. For example, an impending or actual failure of a field device, an out-of-range loop parameter or other control parameter, etc. may result in the generation and conveyance of an alert or alarm to a field technician, plant operator, and/or any other person associated with the affected process control system.

With known alarm or alert paging systems, process control system users or operators typically interface with a configuration tool, which may provide an intuitive graphical user interface or the like, that enables definition of events or conditions that will result in the reporting of one or more alarms, alerts or other conditions to one or more users. In addition, during configuration, a system user or operator may use the configuration tool to define the personnel who receive certain alarm or alert information and in what manners the alarm information should be delivered to the personnel receiving the alarm information. In particular, the system user or operator can typically define alarm routing procedures that are based on simple static routing schedules or, if desired, based on one or more rules, which may vary the routing of an alarm or alert based on the type and/or severity of the alarm or alert, the identity of the person or persons to whom the alarm or alert is to be conveyed, the time of day or current work shift, or any other desired parameter or combination of parameters.

Of course, a single event or condition within a process control plant may trigger multiple alarm or alert messages, some or all of which may be conveyed to a particular person or to a particular group of individuals via a paging system. Further, in some cases, a single alarm or alert may be communicated to one or more individuals via more than one communication link and receiving device. For example, an alarm may be transmitted via a paging system to a cellular pager and a cellular phone that are both associated with a particular person.

Many paging systems are one-way systems in which alarm or alert information is conveyed via a cellular pager or phone. In one-way systems, the pager or phone receiving the message can, in some cases, display a simple textual message that provides the user with important information about the alarm or alert. For example, the message may contain location information (i.e., a physical location within a process plant), information that identifies a particular affected field device or unit, control loop parameters, etc. associated with the alert or alarm. However, one-way systems do not enable the user to respond to an alarm or alert received via the pager or phone using the phone or pager keypad. Instead, these one-way systems require the user to physically travel to a location within the plant associated with the alert or alarm, to place a phone call to another person that can travel to the location and/or to log onto a network coupled to the process control plant via a laptop or remote user terminal to provide a response to the alarm or alert to the process control system that generated the alarm or alert.

Some existing paging systems enable limited two-way communication between a portable communication device (e.g., a pager, cellular phone, PDA, etc.) and a process control system. These two-way systems typically send an enumerated menu of possible responses along with alarm or alert messages to the portable communication device. When the user receives an alarm or alert via their portable communication device, the information pertaining to the alarm or alert (i.e., an alarm or alert message) is typically displayed along with a limited menu of possible responses associated with that alarm or alert. To respond to the alert or alarm, the user may invoke one or more of the possible responses by entering the numbers or digits via a keypad on the communication device that correspond to the desired response or responses.

With most two-way paging systems, responses to alerts or alarms made via a portable communication device are returned to the process control system that issued the alert or alarm via standard paging communication systems and are typically in the form of a simple textual reply message (e.g., in the form of an ASCII string) and/or a numeric value. In the case of a textual reply message, the reply message is typically displayed to one or more system operators, who may, if necessary, respond to the message by taking some action. In the case of a numeric value, the numeric value may be automatically used by the process control system by, for example, writing the value to a control strategy to automatically invoke an appropriate response.

Unfortunately, existing two-way paging systems are very limited in their capabilities and flexibility. In particular, existing two-way paging systems provide very limited monitoring functions that typically only enable the monitoring of conditions or events within a particular process control system. Accordingly, existing two-way paging systems typically do not enable the monitoring of conditions and events on an enterprise-wide basis. In addition, alert or alarm information conveyed by existing two-way paging systems is typically limited to simple textual information, thereby significantly limiting the ability of a field technician, system operator, or any other person associated with the process control system to diagnose, troubleshoot and/or effect a correction in response to the alert or alarm. For example, diagnosing a failed field device or a problematic control loop may require graphical information, image information, or information that is more complex than a simple text message. Still further, with existing two-way paging systems, responses sent by the portable communication devices (e.g., pagers, cell phones, etc.) are typically limited to simple text messages and/or simple numeric values, thereby significantly limiting the ability of the person responding to an alert or alarm to effect an appropriate correction from a remote location.

SUMMARY

In accordance with one aspect, a system and method of transmitting process control information to a portable communication device may associate a resource link with the process control information and transmit the process control information and the resource link to the portable communication device. In addition, the system and method may associate a session identifier with the process control information and the resource link and transmit the session identifier to the portable communication device.

In accordance with another aspect, a method of responding to process control information received at a portable communication device may display a message associated with the process control information and a resource link associated with the process control information, select the resource link and initiate a communication link between the portable communication device and a wireless communication service in response to selection of the resource link. The method may also receive one of video information, audio information, still image information, and software application information in response to initiation of the communication link between the wireless communication service and the portable communication device.

In yet another aspect, a communications server may include a communications interface and a communications collaboration unit that is adapted to send process control information received via the communications interface and a resource link associated with the process control information to a portable communication device. In some examples, the communications collaboration unit may be further adapted to send the process control information received via the communications interface together with a session identifier.

DETAILED DESCRIPTION

Figure 1:
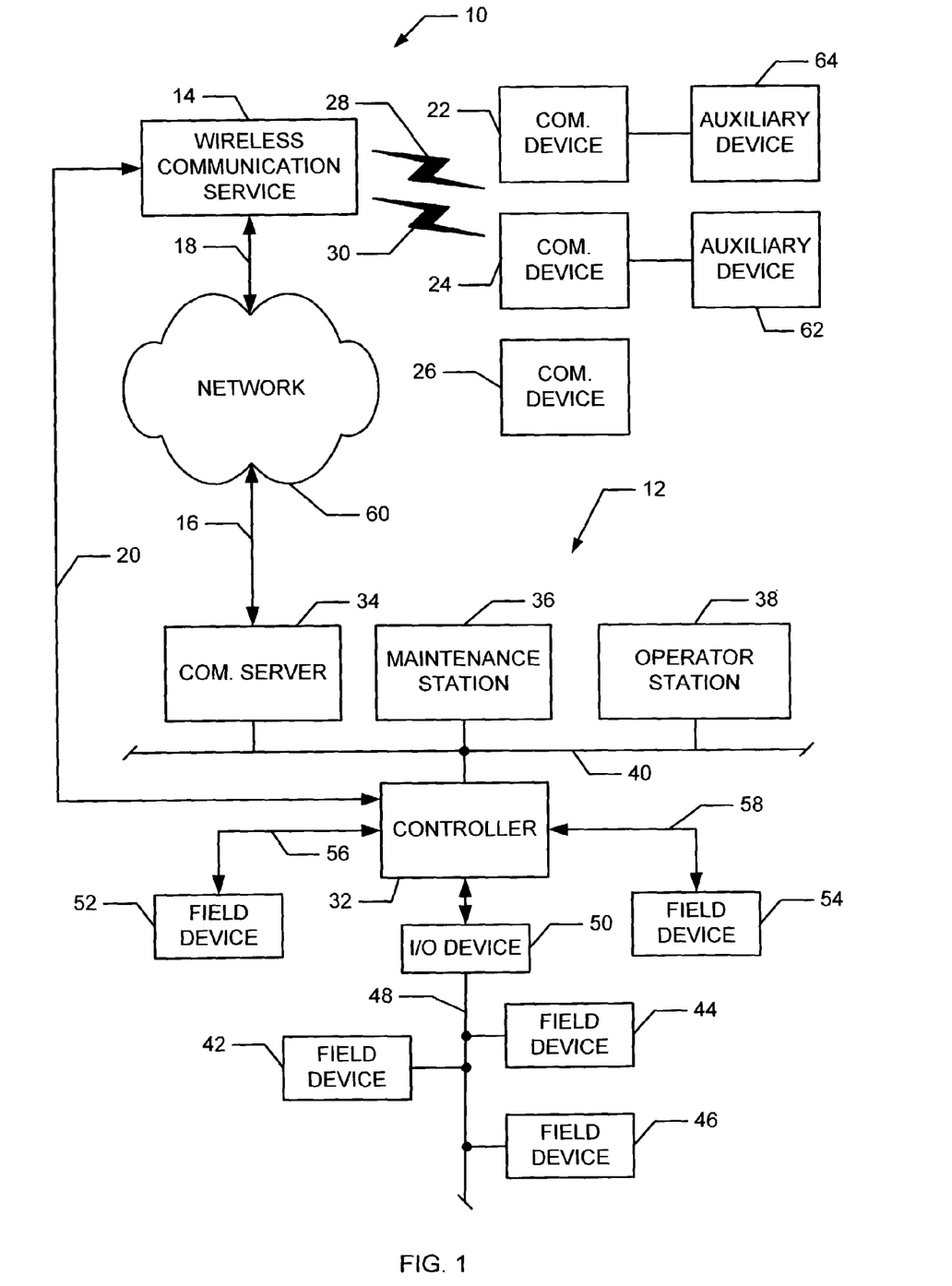
FIG. 1 is a block diagram of an example enterprise within which the interactive collaboration apparatus and methods described herein may be used.

FIG. 1 is a block diagram of an example enterprise 10 within which the interactive collaboration apparatus and methods described herein may be used. As shown in FIG. 1, the enterprise 10 includes a process control system 12 that is communicatively coupled to a wireless communication service 14 (e.g., a paging service, a cellular phone service, etc.) via communication links 16, 18 and 20. In addition, the wireless communication service 14 can communicate with a plurality of wireless communication devices (e.g., cellular pagers, phones, PDAs, laptop computers, wearable computers, etc.) 22, 24 and 26 via one or more wireless communication links 28 and 30.

In general, the process control system 12 generates alert or alarm information in response to the detection of certain predetermined conditions within the process control system 12. The generated alert or alarm information may be conveyed or otherwise routed to the wireless communication service 14 via one or more of the communication links 16, 18 and 20 and, in turn, sent by the wireless communication service 14 to one or more of the wireless communication devices 22, 24 and 26 via one or more of the wireless communication links 28 and 30.

The alert or alarm information conveyed by the process control system 12 to the communication devices 22-26 may include textual information descriptive of the alerts or alarms such as, for example, the device, unit, process control loop parameter, etc. affected by and/or which generated the condition associated with the alert or alarm, the type of the alarm, the severity of the alarm, etc. In addition to a textual message, the alert or alarm information conveyed to the communication devices 22-26 includes one or more communication, information or resource links such as, for example, uniform resource locators (URLs). As described in greater detail below, the resource links may be selected by a user of a wireless communication device (such as one of the communication devices 22-26) receiving the alert or alarm information to establish an interactive or collaborative two-way communication session with the process control system 12 or, more generally, any other device or system within the enterprise 10 that is communicatively coupled to the communications server 34. In particular, a communication, information or resource link associated with alert or alarm information may be selected by a user of a wireless communication device receiving the alert or alarm information to invoke the transmission of information associated with the alert or alarm to that communication device and/or to other communication devices associated with the process control plant or system 12. For example, a particular URL received by one or more of the wireless communication devices 22-26 in connection with an alert or alarm may be associated with or correspond to streaming video information, audio information, a live operator display, documents, etc. stored within a database associated with the process control system 12. The information or data corresponding to the URL may be conveyed to one or more of the communication devices 22-26 in response to selection of the URL by a user of the communication device that received the URL.

The alert or alarm information conveyed to the communication devices 22-26 may also include event collaboration or session identifiers, which may be composed of numeric, alphanumeric, or any other indicia that, as described in greater detail below, may be used to log or track communication events or collaborative, two-way communication sessions between one or more of the communication devices 22-26 and the process control system 12. More specifically, these session identifiers function as collaboration session identifiers that enable the communication transactions that occur between the communication devices 22-26, the process control system 12, or any other systems or devices associated with the enterprise 10 to be uniquely or distinctively associated with a particular alert or alarm. In this manner, a log or audit trail containing all communications associated with each alert or alarm condition can be stored in a database and later retrieved for review and analysis. Additionally, the session identifiers may be used to filter communications (at the communication devices 22-26 and/or the communications server 34) and/or to provide security functions.

As shown in the example of FIG. 1, the process control system 12 includes a controller 32, a communications server 34, a maintenance station 36 and an operator station 38, all of which may be communicatively coupled via a bus or local area network (LAN) 40. The communications server 34, the maintenance station 36 and the operator station 38 may be implemented using one or more workstations or any other suitable computer systems or processing units. In addition, the LAN 40 may be implemented using any desired communication medium and protocol. For example, the LAN may be based on a hardwired or wireless Ethernet communication scheme, which is well known and, thus, is not described in greater detail herein. However, as will be readily appreciated by those having ordinary skill in the art, any other suitable communication medium and protocol could be used.

The controller 32 may be coupled to a plurality of smart field devices 42, 44 and 46 via a digital data bus 48 and an input/output (I/O) device 50. The smart field devices 42-46 may be Fieldbus compliant valves, actuators, sensors, etc., in which case the smart field devices 42-46 communicate via the digital data bus 48 using the well-known Fieldbus protocol.

Of course, other types of smart field devices and communication protocols could be used instead. For example, the smart field devices 42-46 could instead be Profibus or HART compliant devices that communicate via the data bus 48 using the well known Profibus and HART communication protocols. Additional I/O devices (similar or identical to the I/O device 50) may be coupled to the controller 32 to enable additional groups of smart field devices, which may be Fieldbus devices, HART devices, etc., to communicate with the controller 32.

In addition to the smart field devices 42-46, one or more non-smart field devices 52 and 54 may be communicatively coupled to the controller 32. The field devices 52 and 54 may be, for example, conventional 4-20 milliamp (mA) or 0-10 volts direct current (VDC) devices that communicate with the controller 32 via respective hardwired links 56 and 58.

The controller 32 may be, for example, a DeltaV™ controller sold by Fisher-Rosemount Systems, Inc. However, any other controller could be used instead. Further, while only one controller in shown in FIG. 1, additional controllers of any desired type or combination of types could be coupled to the LAN 40. In any case, the controller 32 may perform one or more process control routines associated with the process control system 12 that have been generated by a system engineer or other system operator using the operator station 38 and which have been downloaded to and instantiated in the controller 32. The process control routines instantiated within the controller 32 preferably include alarm or alert generation routines that generate alarm or alert messages based on the detection of certain conditions within the process control system 12. For example, a condition or event detected by one or more of the field devices 42-46 and 52-54 may trigger the generation of an alert or alarm within the controller 32 based on configuration information that may have been downloaded to the controller 32 by a system user or operator via, for example, the operator station 38. Similarly, the controller 32 may detect a condition associated with a control loop such as, for example, an out-of-range or excessively variable loop parameter, that triggers the generation of an alert or alarm message by the controller 32. Alternatively or additionally, routines executed within a workstation or computer system (e.g., the operator station 38, the communications server 34, etc.) coupled to the LAN 40 may generate alerts or alarms based on information received from the controller 32 via the LAN 40.

In any case, the communications server 34 is configured to receive alarm or alert messages generated by the controller 32, the operator station 38, the maintenance station 36 and/or any other workstation, controller, etc. coupled to the LAN 40. As described in greater detail in connection with FIGS. 2 and 3 herein, the communications server 34 monitors alert or alarm messages generated within the process control system 12 and, based on configuration information, conveys some or all of these alert or alarm messages to one or more of the communication devices 22-26 via the wireless communication service 14.

In one example, the communications server 34 is a two-way pager server, the communication links 16 and 18 are phone lines, the network 60 is the Internet, the wireless communication service 14 includes a paging service and the communication devices 22-26 are cellular communication devices such as phones, pagers, PDAs, laptop computers, tablets, etc. having cellular communication interfaces. In this example, the communications server 34, the wireless communication service 14 and one or more of the communication devices 22-26 may use a digital cellular mobile communications protocol such as, for example, the well-known global system for mobile communications (GSM), which is a narrowband time division multiple access scheme, short message service (SMS), and/or any other desired wireless communications scheme or combination of schemes and/or protocols.

As depicted in the example shown in FIG. 1, the communication links 16 and 18 may be communicatively coupled via a network 60. In some examples, the communication links 16 and 18 may be hardwired links such as, for example, phone lines and the network 60 may be the Internet or any other similar packet-switched network. In the case where the communication links 16 and 18 are hardwired links such as phone lines, the links are preferably digital subscriber lines (DSLs) or similar hardwired signal lines providing suitably high data transmission rates. Coupling the communication links 16 and 18 via the packet-switched network (e.g., the Internet) 60 facilitates communications between process control system 12 and geographically remote and widely distributed communication devices because the infrastructure for packet-switched networks such as the Internet is established, inexpensive and is essentially ubiquitous. If desired, the communication links 16 and 18 could instead be communicatively coupled via a hardwired switched network such as, for example, a public switched telephone network (PSTN), a wireless communication system such as, for example, a cellular communication system, a satellite communication system, etc. To improve communications security via the network 60, a virtual private network may be employed for communications between the communication devices 22-26 and the communications server 34.

The controller 32 may, if desired, communicate with the wireless communication service 14 via the communication link 20, which may be implemented using any desired hardwired or wireless link. The controller 32 may send and receive information, including alarm or alert information, command or control information, etc. to and from the wireless communication device 14 and the communication devices 22-26 via the link 20. In some examples, the link 20 may provide an inherently secure communication path for communicating certain or, if desired, all information between the communication devices 22-26 and the process control system 12. As with the communication links 16 and 18, any desired communication protocol or scheme may be used to convey information through the link 20, including, for example, GSM, SMS, etc.

The alert or alarm messages sent by the communications server 34 and/or the controller 32 to one or more of the communication devices 22-26 via the wireless communication service 14 may include textual information associated with the alert or alarm information and a resource link (e.g., a URL). The textual information and the resource link may be displayed on one or more of the communication devices 22-26 to one or more users associated with those devices. In some cases, a single user may be associated with (e.g., may have in their possession) more than one of the communication devices 22-26. In other cases, each of the communication devices 22-26 may be uniquely associated with a particular person. In any case, in response to receipt of textual information associated with an alert or alarm at one of the communication devices 22-26, a user may select a resource link (e.g., a URL) associated with that alert or alarm to establish a communication link or session with the communications server 34 (e.g., via the links 16 and 18 and the network 60) and/or the controller 32 (e.g., via the link 20).

Each resource link within an alert or alarm displayed on one or more of the communication devices 22-26 may be associated with additional information stored within or otherwise accessible by the communications server 34. For example, a resource link may be associated with a document, streaming video information, a live operator display, audio information, or any other desired information associated with its corresponding alert or alarm. By selecting or otherwise invoking the resource link and establishing a communication link between one of the communication devices 22-26 and the communications server 34, the communications server 34 may responsively transmit the information associated with the resource link to the one of the communication devices 22-26 for viewing, manipulation, further processing, etc. by the user. For example, an alarm message indicating that the field device 42 has failed may be communicated by the controller 32 to the communications server 34. The communications server 34 may determine, based on its configuration information, that such an alarm message is to be conveyed to the communication device 22, which may be uniquely associated with a particular plant engineer. The communications server 34 may, for example, send the alarm message in the form of a page or phone message via the links 16 and 18, the network 60, the wireless communication service 14 and one of the links 28 and 30 to the communication device 22. Upon receiving the page or phone message containing the alarm message, the communication device 22 may display textual information, if provided, describing the alarm along with a resource link (e.g., a URL). The plant engineer may view the textual information and may select the resource link to establish a communication link back to the process control system 12 via the communications server 34. The communications server 34 may associate the selected resource link with information pertaining to the alarm such as, for example, documentary information, video information including streaming video and live operator displays, software applications such as an operator interface application associated with the process control system 12, etc. and may download or otherwise transmit some or all of the associated information to the communication device 22 via the links 16 and 18, the network 60 and the wireless communication service 14 using the established communication link. The information downloaded or otherwise provided to the communication device 22 may contain one or more additional resource links to additional information pertaining to the alarm and/or to the downloaded information, thereby enabling the user to select additional resource links to receive further information, establish communications with other resources within or external to the process control system 12 and/or the enterprise 10, etc.

In addition to textual information and a resource link, the page containing the alarm message may also include an identifier uniquely associated with the event or alarm. The session identifier may be used as a tag for all subsequent communications related to that alarm, thereby facilitating the generation of an audit trail for that alarm. More generally, session identifiers for each alert or alarm may be used to generate an operator's log that contains an audit trail or event history for each alarm generated and transmitted by the communications server 34 to the communication devices 22-26. Because the communications server 34 and the communication devices 22-26 associate the session identifier for a given alert or alarm with any subsequent communications or collaboration relating to that alert or alarm, the communications server 34 can generate a complete operator's log or audit trail for each alarm event.

The session identifiers for the alerts or alarms may also be used to filter and/or prioritize responses received from the communication devices 22-26. For example, the communications server 34 may be configured to give a higher priority and, thus, respond first to responses received from particular ones of the communication devices 22-26. In some cases, the communications server 34 may be configured to use session identifiers to ignore responses (and other messages or information) received from communication devices that are not currently authorized to respond. In this manner, the communications server 34 may be used to provide a more secure operating environment by limiting its actions based on responses to a few known, authorized persons and/or communication devices. Of course, the communication devices 22-26 may also use the session identifiers to filter messages, prioritize messages, provide security, etc.

While the pages, phone messages, etc. containing alarm or alert information are described above as containing simple textual information pertaining to the alert or alarm, more complex graphical, audio and/or video information could be included, if desired. Furthermore, more than one resource link could be provided with each alarm or alert message displayed via the communication devices 22-26, thereby enabling the user to establish communications with more than one information source or resource (i.e., resources in addition to or different from the communications server 34). Still further, because the resource links can be URLs or the like, the communication devices 22-26 can establish communications with any information source or resource that is coupled to the network 60 and/or the LAN 40. As a result, information sources or resources (e.g., web sites, applications executed on web servers, etc.) that are external to the process control system 12 and/or the enterprise 10 may be communicatively coupled to one or more of the communication devices 22-26 and/or the communications server 34. Likewise, alerts or alarms generated outside of the process control system 12 or the enterprise 10, can send a page, phone message, etc. containing alarm or alert information to the communication devices 22-26 using any desired paging or phone messaging service, which may be part of the wireless communication service 14, or which may be part of some other wireless communication service not shown in FIG. 1.

Although the enterprise 10 shown in FIG. 1 depicts a single process control system 12 coupled to the wireless communication service 14, the enterprise 10 could contain additional process control systems, each of which may be coupled to the wireless communication service 14 via the network 60 using communication links similar or identical to the links 16 and 18 and/or using one or more links similar or identical to the link 20. Additionally, the functions of the communications server 34 described in general above and in greater detail below may be performed within a single workstation or computer system as depicted in FIG. 1 or, alternatively, may be distributed among a plurality of processing or computer systems, including, for example, the maintenance station 36, the operator station 38 or any other workstation or computer system coupled to the LAN 40 and/or the network 60.

The enterprise 10 may also include a plurality of auxiliary devices 62 and 64, one or more of which may be coupled to one of more of the communication devices 22-26. The auxiliary devices 62 and 64 may include digital cameras, digital video equipment, telephones, etc. that enable a user to form or augment an appropriate response to a page containing an alert or alarm. For example, in the case where a user receives a page containing an alarm via a PDA, the user may want to couple a telephone to the PDA to enable the generation of an audio response or message to be conveyed to the communications server 34.

Figure 2:
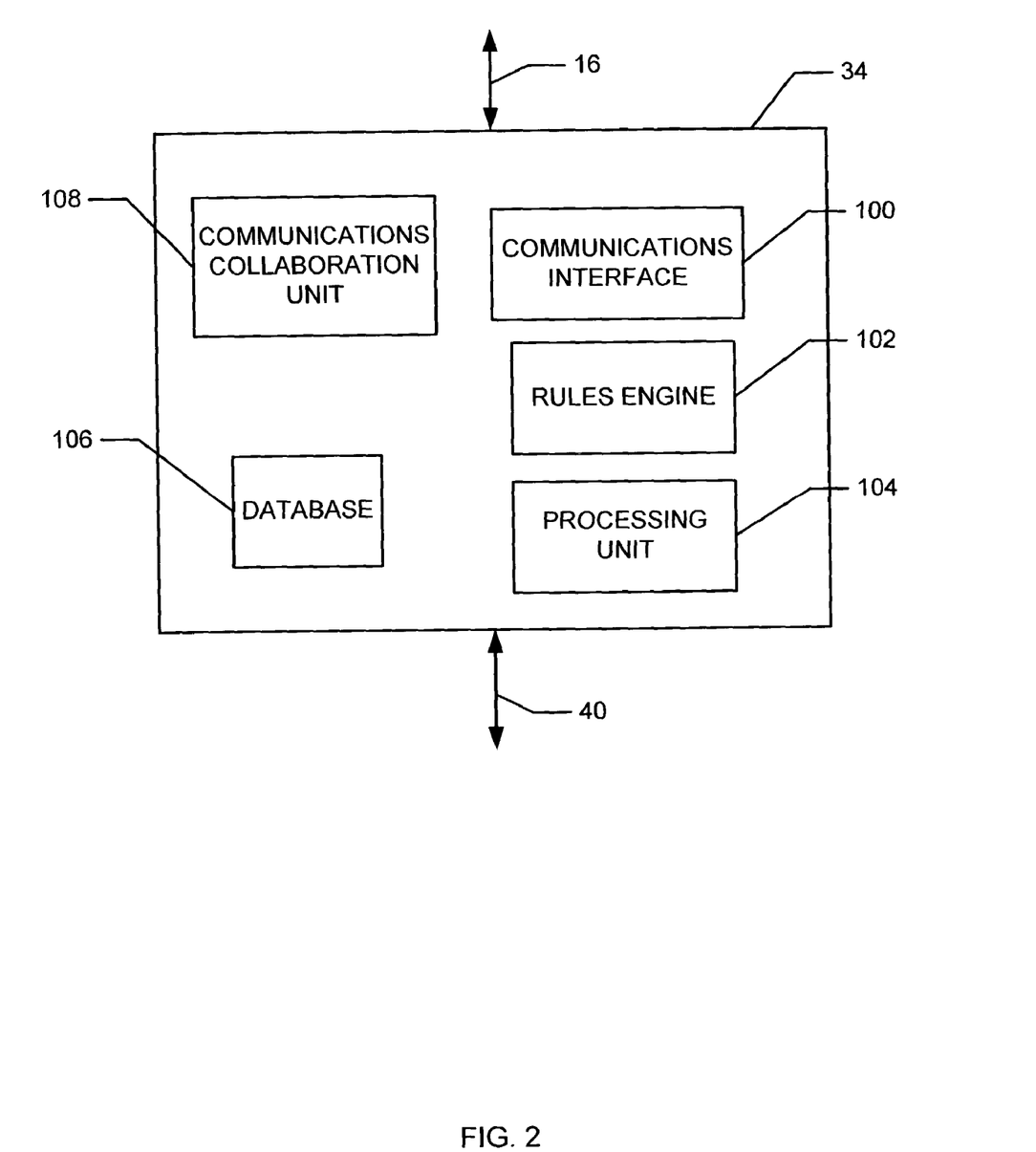
FIG. 2 is a more detailed block diagram of an example manner in which the communication server shown in FIG. 1 may be implemented.

FIG. 2 is a more detailed block diagram of an example manner in which the communications server 34 shown in FIG. 1 may be implemented. As shown in FIG. 2, the communications server 34 includes a communications interface 100, a rules engine 102, a processing unit 104, a database 106, which may be maintained in a memory (not shown), and a communications collaboration unit 108.

The communications interface 100 may include, for example, a modem in the case where the communication link 16 is a DSL or phone line and also includes an Ethernet adapter or other suitable communication circuitry to enable the communications server 34 to communicate via the LAN 40. The communications interface 100 may also include a transport control protocol (TCP) stack that enables the communications server 34 to encapsulate messages such as, for example, alarm or alert messages, video information, audio information, still image information, etc., using Internet protocol (IP) into packets for transmission via the communication link 16 and the packet-switched network 60 to the wireless communication service 14. As is known, IP encapsulated packets contain a header that specifies the destination address for the packets. In addition, the TCP stack enables the communications server 34 to receive IP packets sent to the communications server 34 via the network 60 from one or more of the communication devices 22-26 and the wireless communication service 14. As is known, the TCP stack enables message content (e.g., video information, audio information, etc.) to be separated from the encapsulation layers of the protocol. If desired, the communications interface 100 may also include encryption and decryption mechanisms that enable secure communications between the communication devices 22-26 and the process control system 12.

The rules engine 102 determines how alarms and alerts are to be routed to the communication devices 22-26 (e.g., pagers, cell phones, PDAs, laptops, etc.) associated with various plant personnel and/or entities affected by the operations of the enterprise 10. For example, based on the type and/or severity of a particular alert or alarm, the time of day, etc., the rules engine 102 may filter (i.e., decide to route or not to route) that alarm or alert to any communication device, may decide to route that particular alert or alarm to a particular person via a particular communication device associated with that person, or may decide to route that particular alarm to a group or list of communication devices, which may include any combination of device types (e.g., pagers, cell phones, PDAs, laptops, etc.), associated with a group of people. If desired, the rules engine 102 may monitor and limit the number and/or frequency of pages generated in response to a particular alarm or alert to prevent excessive paging or other messaging (i.e., paging red-out).

The processing unit 104 may be any known or suitable microprocessor, microcontroller, ASIC, etc. that can execute instructions or data stored on a memory (not shown) to carry out the methods described herein. Preferably, but not necessarily, the processing unit 104 coordinates the flow of data between the communications interface 100, the rules engine 102, the database 106 and the communications collaboration unit 108. In addition, processing unit 104 may be used to perform mathematical calculations as needed by the activities of the communications interface 100, the rules engine 102 and the communications collaboration unit 108. While a single processing unit 104 is shown in FIG. 2, multiple processing units could be used instead.

The database 106 contains information pertaining to alerts or alarms including an audit trail or operator's log for alerts or alarms. The database 106 may include a non-volatile memory such as an optical or magnetic disk drive, magnetic tape, etc. and/or may include a volatile memory with or without a battery backup. More specifically, the database 106 may contain detected conditions, documents pertaining to alerts or alarms, audio information, video information, still image information, etc., all of which may be pertinent to one or more of the alerts or alarms that are processed by the communications server 34 and which may be conveyed to one or more of the communication devices 22-26. The database 106 may also contain a list of users that are currently logged on to the communications server 34 and/or more generally the process control system 12 or enterprise 10, lists of other possible users (some of which may not be logged on), paging numbers, phone numbers, etc. that may be used by the communications server 34 in carrying out its communications routing or management activities.

The communications collaboration unit 108 manages or coordinates communications between the communications server 34, the communication devices 22-26, and any other systems or devices that are communicatively coupled to the process control system 12, the network 60 and/or the wireless communications service 14. In general, the communications collaboration unit 108 receives alarm or alert information, generates pages, e-mails, phone messages, etc. containing that alarm or alert information (assuming the rules engine 102 does not prevent the transmission of the alert of alarm information), generates resource links for those pages, e-mails, phone messages, etc. that may be associated with information (i.e., linked to information) in the database 106 that may be useful to those receiving the alert or alarm information, generates unique session identifiers for each alarm or alert event and creates and maintains an operator's log or audit trail for the events (e.g., alarms or alerts) conveyed through the communications server 34 to one or more of the communication devices 22-26 in the database 106. The audit trail or operator's log may be configured so that interactive collaborations such as, for example, a series of pages or other communications between one or more entities or users relating to a particular alarm or alert event and, thus, a particular session identifier.

The functional blocks 100-108 shown in the example communications server 34 of FIG. 2 may be implemented using any desired combination of software, firmware and hardware. For example, one or more microprocessors, microcontrollers, application specific integrated circuits (ASICs), etc. may access instructions or data stored on machine or processor accessible storage media to carry out the methods described herein. The storage media may include any combination of devices and/or media such as, for example, solid state storage media including random access memory (RAM), read-only memory (ROM), electrically erasable programmable read-only memory (EEPROM), etc., optical storage media, magnetic storage media, etc. In addition, software used to implement the functional blocks 100-108 may additionally or alternatively be delivered to and accessed by the processor or other device or devices executing the software via the Internet, telephone lines, satellite communications, etc.

Figure 3:
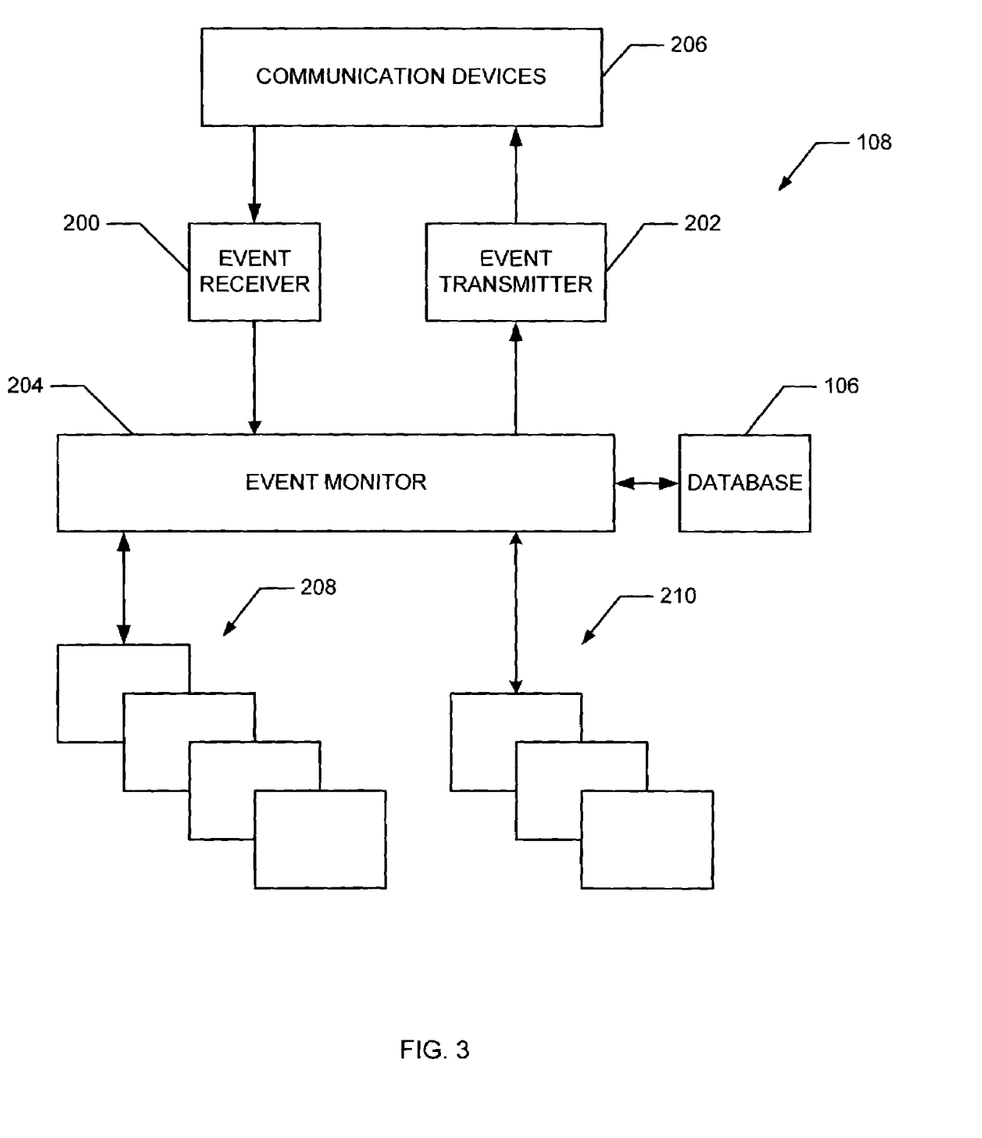
FIG. 3 is a block diagram of an example manner in which the apparatus shown in FIGS. 1 and 2 may be configured to carry out the methods described herein.

FIG. 3 is a block diagram of an example manner in which the apparatus shown in FIGS. 1 and 2 may be configured to carry out the methods described herein. As shown in FIG. 3, the communications collaboration unit 108 of the communications server 34 includes an event receiver 200, an event transmitter 202 and an event monitor 204. The event monitor 204 is coupled to the database 106 of the communications server 34 and to a plurality of process management, control, and enterprise management systems 208 and 210. The systems 208 and 210 may include, for example, one or more process control systems (e.g., the process control system 12) that may provide information pertaining to process control parameters, loops, etc., device information such as, for example, device health, status, conditions, etc., equipment information, etc. to the event monitor 204 in the form of alert or alarm information. The systems 208 and 210 may also include maintenance systems (e.g., the maintenance station 36), engineering systems, business management systems, etc. As is also shown in FIG. 3, the event receiver 200 and the event transmitter 202 are communicatively coupled to the communication devices 206, which may include one or more of the devices 22-26 shown in FIG. 1.

In operation, the event monitor 204 may receive an alert or alarm message from one of the systems 208 and 210 via the communications interface 100 and the rules engine 102 of the communications server 34 as shown in FIG. 2. The event monitor 204 may then generate a session identifier for the alert or alarm message and may store this session identifier in the database 106. The event monitor 204 also associates one or more resource links with the alarm or alert message so that information pertinent to that alarm or alert message stored in the database 106, or which is available at some other location accessible by the communication devices 206, can be linked to the alarm or alert message. The event monitor 204 may also associate a textual message, which may be provided with the alert or alarm message by one of the systems 208 and 210 or retrieved from the database 106, with the alert or alarm message. The event monitor 204 then sends the alarm or alert message together with its associated textual message, session identifier and resource link or links to the event transmitter 202. The event transmitter 202 conveys all of the information pertaining to the alarm or alert message to one or more of the communication devices 206 in the form of a page, a phone message (e.g., GSM/SMS), an e-mail, etc. The event monitor 204 also sends a copy of the alert or alarm message, including its session identifier, resource links, etc. to the database 106 for inclusion in an audit trail, event history, or operator's log, which is preferably, but not necessarily, organized using the unique session identifiers (i.e., all collaboration or communication activities associated with a particular session identifier are stored sequentially within the database 106).

Upon receiving an alert or alarm message, one of the communication devices 206 may display the textual message associated with the alert or alarm along with its associated resource link or links. The user of a communication device receiving the alert or alarm message may, if desired, respond to the message by selecting one of the resource links to establish a communication link to, for example, the communications server 34. The responsive message may be sent from the communication device to the communications server 34 via the wireless communication service 14. The responsive message preferably includes a copy of the session identifier. The event receiver 200 receives the responsive message and stores a copy of the responsive message in the database 106. The responsive message is stored in sequence in the audit trail or operator's log in historical sequence with other messages having the same session identifier. In addition, the communications collaboration unit 108 may retrieve information associated with the resource link (e.g., video information, audio information, still image information, etc.) from the database 106 and may send this information (i.e., download this information) to the responsive communication device via the established communication link. The communication devices 206 may, if desired, utilize web browser software, for example, so that when a resource link such as a URL is selected, a two-way communications connection can be easily established between that communications device and the communications server 34. However, other communication software could be used instead.

Figure 4:
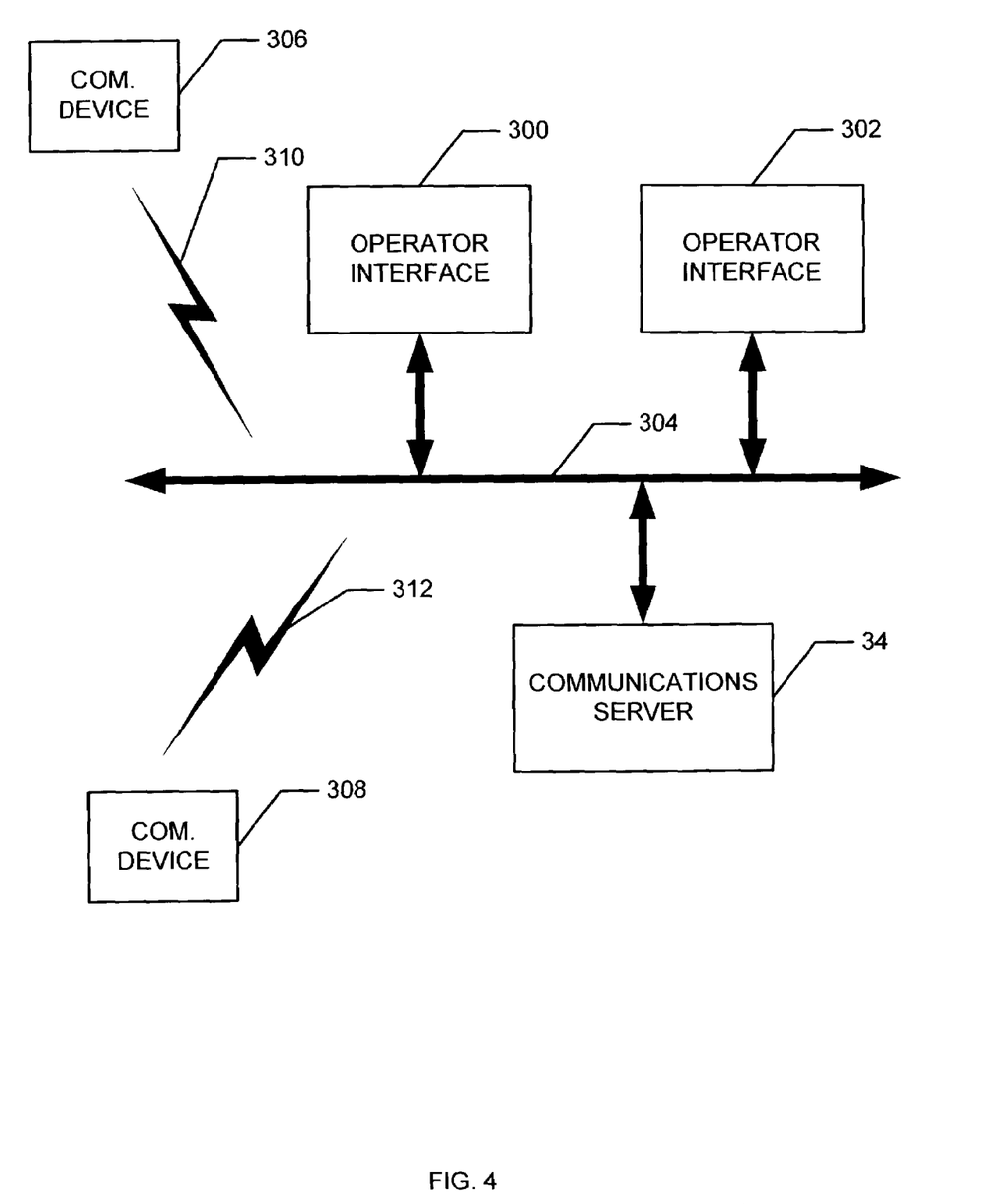
FIG. 4 is a diagrammatic view of an example manner in which apparatus and methods described herein may be used to establish communications between users within the enterprise.

FIG. 4 is a diagrammatic view of an example manner in which apparatus and methods described herein may be used to quickly establish two-way communications with users that are logged on to the communications server 34. As shown in FIG. 4, a plurality of operation interface stations 300 and 302 may be communicatively coupled via a network 304 to the communications server 34. In addition, a plurality of communication devices 306 and 308 may be communicatively coupled to the communications server 34 via wireless communication links 310 and 312.

In operation, the communications server 34 maintains a list of logged-on users in the database 106. The communications server 34 may provide the list of logged-on users to the operator interface stations 300 and 302 which, in turn, may display the list of logged on users. In the example shown in FIG. 4, a person may be logged on the communications server 34 via any one or all of the communication devices 306 and 308 and any or all the operator interfaces 300 and 302. Any of the users may view a list of currently logged-on users and may select, via a display and keypad, for example, one of the other logged-on users to thereby establish a communication link with that other user. Thus, users at any of the communication devices 306 and 308 can establish a communication link with each other or with one or more of the operator stations 300 and 302. Likewise, users at the operator interfaces 300 and 302 can establish a communication link with each other or with one or more of the communication devices 306 and 308.

In examples where the network 304 includes a packet-switched network, the communications server 34 may employ voice over IP, extensible markup language (XML), web service definition language (WSDL), simple object access protocol (SOAP) and/or UDDI to carry out the communications in an efficient manner. Of course, the network 304 may include hardwired phone lines (e.g., DSL), satellite links, cellular links, etc. in addition to or instead of the packet-switched network.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of transmitting process control information to a portable communication device, comprising:

associating a user-selectable resource link with the process control information;

retrieving a rule indicative of persons to which the user-selectable resource link and the process control information should be communicated, wherein a plurality of persons are authorized to access information in a system associated with the process control information, and wherein the persons to which the user-selectable resource link and the process control information should be communicated is a portion of the plurality of persons authorized to access information in the system;

selectively transmitting the process control information and the user-selectable resource link based on the rule to a portable communication device uniquely associated with one of the persons indicated by the rule; and transmitting second process control information to the portable communication device in response to receiving input indicative of a user selection of the user-selectable resource link, wherein the second process control information is associated with the process control information and is relatively more detailed than the process control information.

2. The method of claim 1, further including associating a session identifier with the process control information and the user-selectable resource link and transmitting the session identifier to the portable communication device.

3. The method of claim 1, wherein the rule comprises a list, and wherein, based on a time of day, the list indicates the persons to which the user-selectable resource link and the process control information should be communicated.

4. The method of claim 2, further including storing the process control information and the session identifier in a database based on the session identifier.

5. The method of claim 1, wherein associating the user-selectable resource link with the process control information includes associating a uniform resource locator with the process control information.

6. The method of claim 1, wherein associating the user-selectable resource link with the process control information includes associating the user-selectable resource link with one of alert or alarm information.

7. The method of claim 1, wherein transmitting the user-selectable resource link and the process control information to the portable communication device includes transmitting the user-selectable resource link and the process control information to the portable communication device via a packet-switched network and a wireless communication service.

8. The method of claim 7, wherein transmitting the user-selectable resource link and the process control information to the portable communication device via the packet-switched network and the wireless communication service includes transmitting the user-selectable resource link and the process control information using a virtual private network.

9. The method of claim 7, wherein transmitting the user-selectable resource link and the process control information to the portable communication device via the packet-switched network and the wireless communication service includes transmitting the process control information and the user-selectable resource link via an internet and a cellular communications system.

10. The method of claim 1, wherein associating the user-selectable resource link with the process control information further includes associating one of image information, video information, audio information, or a software application with the process control information.

11. The method of claim 1, wherein transmitting the process control information and the user-selectable resource link to the portable communication device includes transmitting the process control information and the user-selectable resource link within one of a pager message, a phone message, or an e-mail.

12. The method of claim 1, wherein the second process control information is at least one of video information, audio information, still image information, or software application information.

13. The method of claim 1, further including generating the process control information within a controller and transmitting the process control information to the portable communication device from the controller.

14. The method of claim 13, wherein transmitting the process control information from the controller includes transmitting the process control information via a communication link that is dedicated for use by the controller.

15. The method of claim 1, further including using a rules engine to filter the process control information prior to transmitting the process control information and the user-selectable resource link to the portable communication device.

16. The method of claim 1, wherein transmitting the process control information and the user-selectable resource link to the portable communication device includes transmitting the process control information and the user-selectable resource link via a secure communication link.

17. A system for transmitting process control information to a portable communication device, comprising:
a communications server programmed to:
associate a user-selectable resource link with the process control information;
retrieve a rule indicative of persons to which the user-selectable resource link and the process control information should be communicated, wherein a plurality of persons are authorized to access information in a system associated with the process control information, and wherein the persons to which the user-selectable resource link and the process control information should be communicated is a portion of the plurality of persons authorized to access information in the system;
selectively transmit the process control information and the user-selectable resource link based on the rule to a portable communication device uniquely associated with one of the persons indicated by the rule; and
transmit second process control information to the portable communication device in response to receiving input indicative of a user selection of the user-selectable resource link, wherein the second process control information is associated with the process control information and is relatively more detailed than the process control information.

18. The system of claim 17, wherein the communications server is programmed to associate a session identifier with the process control information and the user-selectable resource link and transmit the session identifier to the portable communication device.

19. The system of claim 18, wherein the communications server is programmed to store the process control information and the session identifier in a database based on the session identifier.

20. The system of claim 17, wherein the communications server is programmed to associate the user-selectable resource link with the process control information by associating a uniform resource locator with the process control information.

21. The system of claim 17, wherein the communications server is programmed to associate the user-selectable resource link with the process control information by associating the user-selectable resource link with one of alert or alarm information.

22. The system of claim 17, wherein the communications server is programmed to transmit the user-selectable resource link and the process control information to the portable communication device by transmitting the user-selectable resource link and the process control information via a packet-switched network and a wireless communication service.

23. The system of claim 22, wherein the communications server is programmed to transmit the user-selectable resource link and the process control information to the portable communication device via the packet-switched network and the wireless communication service using a virtual private network.

24. The system of claim 22, wherein the communications server is programmed to transmit the user-selectable resource link and the process control information to the portable communication device via the packet-switched network and the wireless communication service by transmitting the process control information and the user-selectable resource link via an internet and a cellular communications system.

25. The system of claim 17, wherein the communications server is programmed to associate the user-selectable resource link with the process control information by associating one of image information, video information, audio information, or a software application with the process control information.

26. The system of claim 17, wherein the communications server is programmed to transmit the process control information and the user-selectable resource link to the portable communication device by transmitting the process control information and the user-selectable resource link to the portable communication device within one of a pager message, a phone message, or an e-mail.

27. The system of claim 17, wherein the second process control information includes at least one of video information, audio information, still image information, or software application information.

28. The system of claim 17, wherein the rule comprises a list, and wherein, based on a time of day, the list indicates the persons to which the user-selectable resource link and the process control information should be communicated.

29. The system of claim 17, wherein the communications server is programmed to use a secure communication link to transmit the process control information and the user-selectable resource link to the portable communication link.

30. The system of claim 29, wherein the secure communication link includes a virtual private network.

31. A machine accessible medium having data stored thereon that, when accessed, causes a machine to:
associate a user-selectable resource link with process control information;
retrieve a rule indicative of persons to which the user-selectable resource link and the process control information should be communicated, wherein a plurality of persons are authorized to access information in a system associated with the process control information, and wherein the persons to which the user-selectable resource link and the process control information should be communicated is a portion of the plurality of persons authorized to access information in the system;
selectively transmit the process control information and the user-selectable resource link based on the rule to a portable communication device uniquely associated with one of the persons indicated by the rule; and
transmit second process control information to the portable communication device in response to receiving input indicative of a user selection of the user-selectable resource link, wherein the second process control information is associated with the process control information and is relatively more detailed than the process control information.

32. The machine accessible medium of claim 31, wherein the data stored thereon, when accessed, causes the machine to associate a session identifier with the process control information and the user-selectable resource link and transmit the session identifier to the portable communication device.

33. The machine accessible medium of claim 31, wherein the data stored thereon, when accessed, causes the machine to transmit the user-selectable resource link and the process control information to the portable communication device by transmitting the user-selectable resource link and the process control information via a packet-switched network and a wireless communication service.

34. The machine accessible medium of claim 33, wherein the data stored thereon, when accessed, causes the machine to transmit the user-selectable resource link and the process control information to the portable communication device via the packet-switched network and the wireless communication service by transmitting the process control information and the user-selectable resource link via an internet and a cellular communications system.

35. The machine accessible medium of claim 31, wherein the data stored thereon, when accessed, causes the machine to transmit the process control information and the user-selectable resource link to the portable communication device by transmitting the process control information and the user-selectable resource link within one of a pager message, a phone message, or an e-mail.

36. A communications server, comprising:
a communications interface;
a rules engine to retrieve a rule indicative of persons to which a user-selectable resource link and process control information should be communicated, wherein a plurality of persons are authorized to access information in a system associated with the process control information, and wherein the persons to which the user-selectable resource link and the process control information should be communicated is a portion of the plurality of persons authorized to access information in the system; and
a communications collaboration unit that is adapted to:
selectively send the process control information received via the communications interface and the user-selectable resource link associated with the process control information based on the rule to a portable communication device uniquely associated with one of the persons indicated by the rule; and
transmit second process control information to the portable communication device in response to receiving input indicative of a user selection of the user-selectable resource link, wherein the second process control information is associated with the process control information and is relatively more detailed than the process control information.

37. The communications server of claim 36, wherein the communications collaboration unit is further adapted to send the process control information received via the communications interface together with a session identifier.

38. The communications server of claim 37, further including a database containing a log of communications between the communications server and the portable communication device, wherein the log of communications organizes the process control information using the session identifier.

39. The communications server of claim 36, wherein the communications collaboration unit is adapted to send the process control information via the communications interface to the portable communication device as one of a page, a phone message, or an e-mail.

40. The communications server of claim 36, wherein the communications interface is adapted to communicate with a wireless communication service via one of a phone line or a packet-switched network.

41. The communications server of claim 40, wherein the communications interface includes one of a modem or an Ethernet interface.

42. The communications server of claim 36, wherein the communications collaboration unit is adapted to establish a communication link with the portable communication device in response to receiving a communication associated with the user-selectable resource link from the portable communication device.

43. The communications server of claim 42, wherein the communication link is a secure communication link.

44. The communications server of claim 43, wherein the secure communication link is a virtual private network.

45. The communications server of claim 42, wherein the communications collaboration unit is further adapted to transmit the second process control information to the portable communication device via the communication link in response to receiving the communication associated with the user-selectable resource link, wherein the second process control information includes at least one of video information, audio information, textual information, or software application information.

46. The communications server of claim 36, wherein the rule comprises a list, and wherein, based on a time of day, the list indicates the persons to which the user-selectable resource link and the process control information should be communicated.

47. The method of claim 1, wherein the process control information is indicative of a condition in a process control system, and wherein the transmission of the process control information and the user-selectable resource link is triggered by the condition.

48. The system of claim 17, wherein the process control information is indicative of a condition in a process control system, and wherein the transmission of the process control information and the user-selectable resource link is triggered by the condition.

49. The machine accessible medium of claim 31, wherein the process control information is indicative of a condition in a process control system, and wherein the transmission of the process control information and the user-selectable resource link is triggered by the condition.

50. The communications server of claim 36, wherein the process control information is indicative of a condition in a process control system, and wherein the transmission of the process control information and the user-selectable resource link is triggered by the condition.

51. The method of claim 1, further comprising:
associating a session identifier with the user-selectable resource link;
receiving a response message from the portable communication device associated with the user selection of the user-selectable resource link; and
generating an audit log by storing the response message in association with a plurality of other messages associated with the same session identifier.

52. The method of claim 1, further comprising:
associating a session identifier with the user-selectable resource link;
receiving a response message from the portable communication device associated with the user selection of the user-selectable resource link; and
prioritizing the response message for processing relative to a plurality of other response messages based on the session identifier of the response message and session identifiers associated with the other response messages.

53. The system of claim 17, wherein the communications server is further to:
associate a session identifier with the user-selectable resource link;
receive a response message from the portable communication device associated with the user selection of the user-selectable resource link; and
generate an audit log by storing the response message in association with a plurality of other messages associated with the same session identifier.

54. The system of claim 17, wherein the communications server is further to:
associate a session identifier with the user-selectable resource link;
receive a response message from the portable communication device associated with the user selection of the user-selectable resource link; and
prioritize the response message for processing relative to a plurality of other response messages based on the session identifier of the response message and session identifiers associated with the other response messages.

55. The machine accessible medium of claim 31, wherein the data stored thereon, when accessed, causes the machine to:
associate a session identifier with the user-selectable resource link;
receive a response message from the portable communication device associated with the user selection of the user-selectable resource link; and
generate an audit log by storing the response message in association with a plurality of other messages associated with the same session identifier.

56. The machine accessible medium of claim 31, wherein the data stored thereon, when accessed, causes the machine to:
associate a session identifier with the user-selectable resource link;
receive a response message from the portable communication device associated with the user selection of the user-selectable resource link; and
prioritize the response message for processing relative to a plurality of other response messages based on the session identifier of the response message and session identifiers associated with the other response messages.

57. The communications server of claim 36, wherein the communications collaboration unit is further to:
associate a session identifier with the user-selectable resource link;
receive a response message from the portable communication device associated with the user selection of the user-selectable resource link; and
generate an audit log by storing the response message in association with a plurality of other messages associated with the same session identifier.

58. The communications server of claim 36, wherein the communications collaboration unit is further to:
associate a session identifier with the user-selectable resource link;
receive a response message from the portable communication device associated with the user selection of the user-selectable resource link; and
prioritize the response message for processing relative to a plurality of other response messages based on the session identifier of the response message and session identifiers associated with the other response messages.

* * * * *

UNITED STATES PATENT AND TRADEMARK OFFICE
CERTIFICATE OF CORRECTION

PATENT NO. : 7,574,509 B2  
APPLICATION NO. : 10/303513  
DATED : August 11, 2009  
INVENTOR(S) : Nixon et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1222 days.

Signed and Sealed this

Seventh Day of September, 2010

David J. Kappos
*Director of the United States Patent and Trademark Office*